(12) United States Patent
Adkins

(10) Patent No.: US 9,135,366 B2
(45) Date of Patent: Sep. 15, 2015

(54) GALAXY SEARCH DISPLAY

(76) Inventor: Mark Alan Adkins, Carlsbad, CA (US)

( * ) Notice: Subject to any disclaimer, the term of this patent is extended or adjusted under 35 U.S.C. 154(b) by 587 days.

(21) Appl. No.: 13/597,777

(22) Filed: Aug. 29, 2012

(65) Prior Publication Data
US 2013/0061165 A1 Mar. 7, 2013

Related U.S. Application Data

(60) Provisional application No. 61/531,986, filed on Sep. 7, 2011.

(51) Int. Cl.
*G06F 17/30* (2006.01)

(52) U.S. Cl.
CPC .... *G06F 17/30905* (2013.01); *G06F 17/30696* (2013.01); *G06F 17/30873* (2013.01)

(58) Field of Classification Search
CPC ............... G06F 17/30554; G06F 17/30696; G06F 17/3084; G06F 17/30873; G06F 17/30973; G06F 17/30991; G06F 17/30994; Y10S 707/99943
See application file for complete search history.

(56) References Cited

U.S. PATENT DOCUMENTS

| | | | |
|---|---|---|---|
| 6,070,176 A * | 5/2000 | Downs et al. ................. | 715/234 |
| 6,654,738 B2 | 11/2003 | Nishioka et al. | |
| 6,810,402 B2 | 10/2004 | Bates et al. | |
| 7,006,922 B2 * | 2/2006 | Lary et al. ....................... | 702/19 |
| 7,539,693 B2 | 5/2009 | Frank et al. | |
| 7,624,101 B2 | 11/2009 | Lin et al. | |
| 7,921,379 B1 | 4/2011 | Ko | |
| 8,108,383 B2 | 1/2012 | Lin et al. | |
| 2005/0060287 A1 | 3/2005 | Hellman et al. | |
| 2006/0026536 A1 * | 2/2006 | Hotelling et al. ............. | 715/863 |
| 2008/0082578 A1 | 4/2008 | Hogue et al. | |
| 2008/0208819 A1 | 8/2008 | Wang et al. | |
| 2008/0229223 A1 * | 9/2008 | Kake ............................. | 715/764 |
| 2008/0243784 A1 * | 10/2008 | Stading ............................. | 707/3 |
| 2009/0100363 A1 * | 4/2009 | Pegg et al. .................... | 715/765 |
| 2009/0228785 A1 | 9/2009 | Creekbaum et al. | |
| 2009/0284531 A1 * | 11/2009 | Ishioka ........................ | 345/440 |
| 2011/0138329 A1 * | 6/2011 | Wells et al. ................... | 715/830 |
| 2012/0151043 A1 * | 6/2012 | Venkataraman et al. ..... | 709/224 |

OTHER PUBLICATIONS

Rosvall, Martin, and Carl T. Bergstrom. "Maps of random walks on complex networks reveal community structure." Proceedings of the National Academy of Sciences 105.4 (2008): 1118-1123.*

* cited by examiner

*Primary Examiner* — Namitha Pillai
*Assistant Examiner* — Liang Li
(74) *Attorney, Agent, or Firm* — Steven A. Nielsen; www.NielsenPatents.com

(57) ABSTRACT

A computer implemented system and method presents search results in various forms upon a physical display. The spacing and movement of presented search results may be subjected to system defined gravitational forces wherein presented search results are shown as spheres or other icons of various sizes positioned at various distances from the center of the display. Displayed search results with greater ranking are displayed as relatively larger spheres or icons nearer the center of a display as compared to lower ranking results, which are smaller and displayed further afield. Ranking is shown as a matter of degree, rather than just as an ordinal list as in the related art. Attributes, such as link age, quantity, and other characteristics, of represented websites and various interconnections among represented websites are depicted by user controlled toggles.

16 Claims, 16 Drawing Sheets

FIG. 6  Machines and Machine Transformations

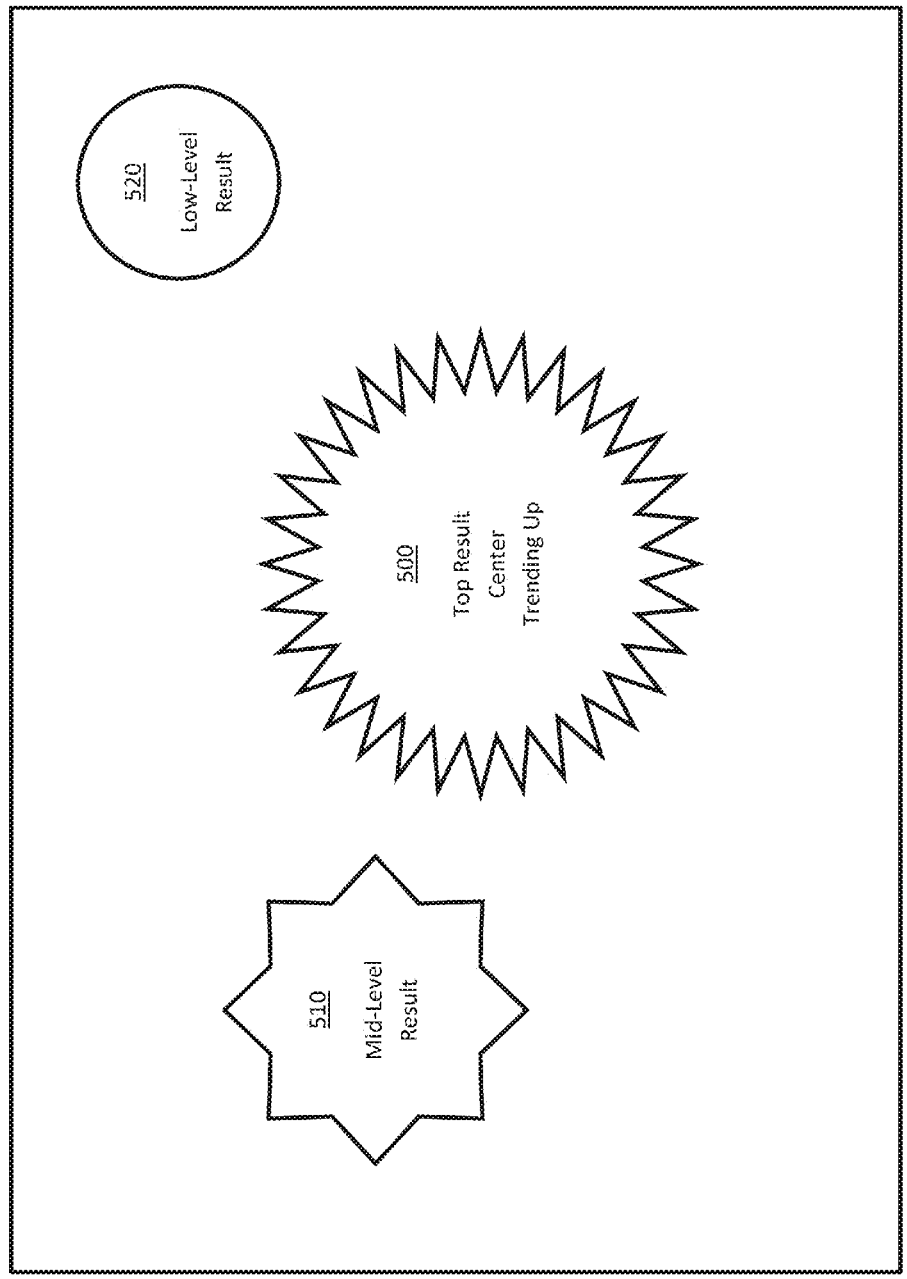
FIG. 9  Result Map

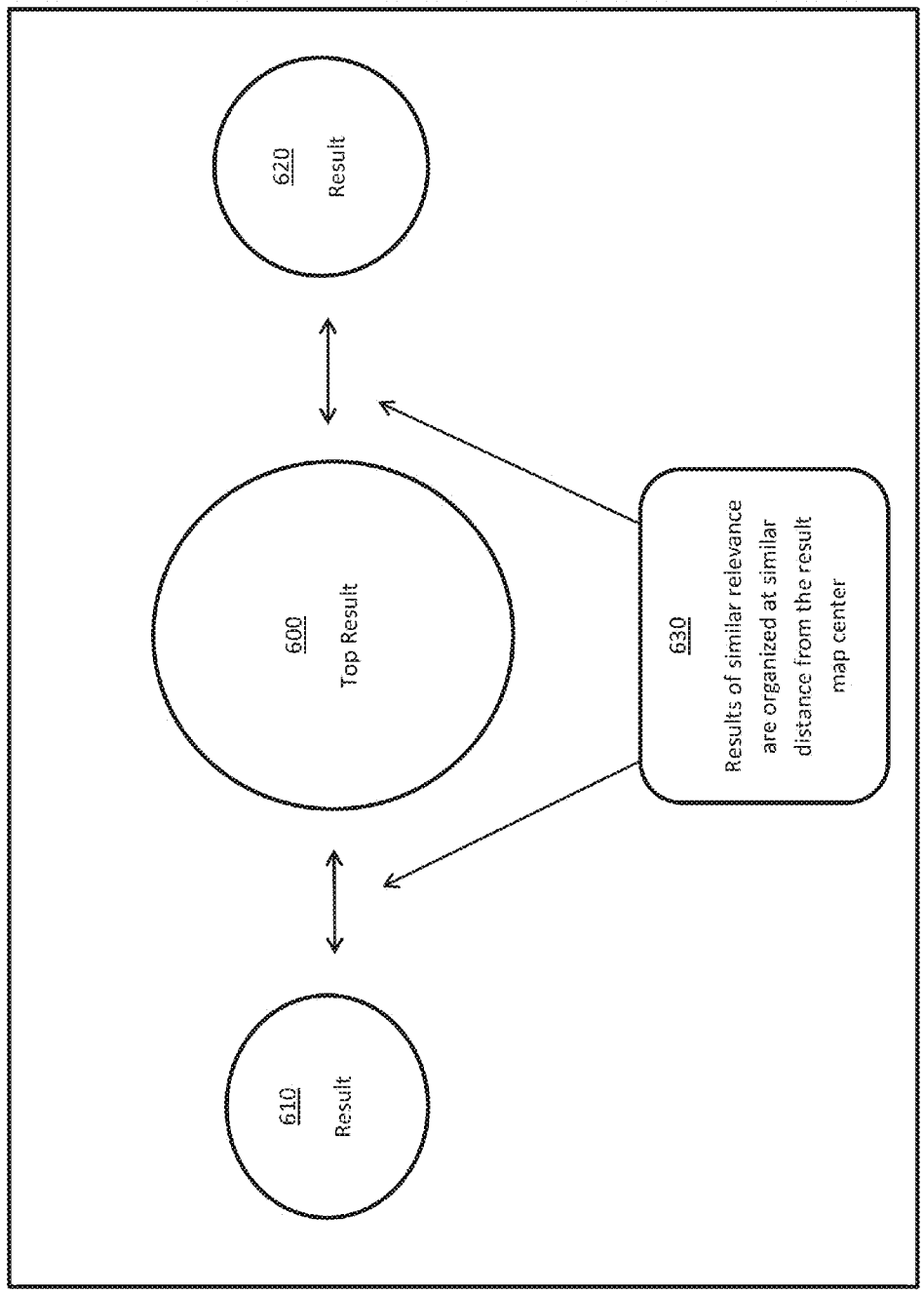
FIG. 10  Result Map   How Gravity Works

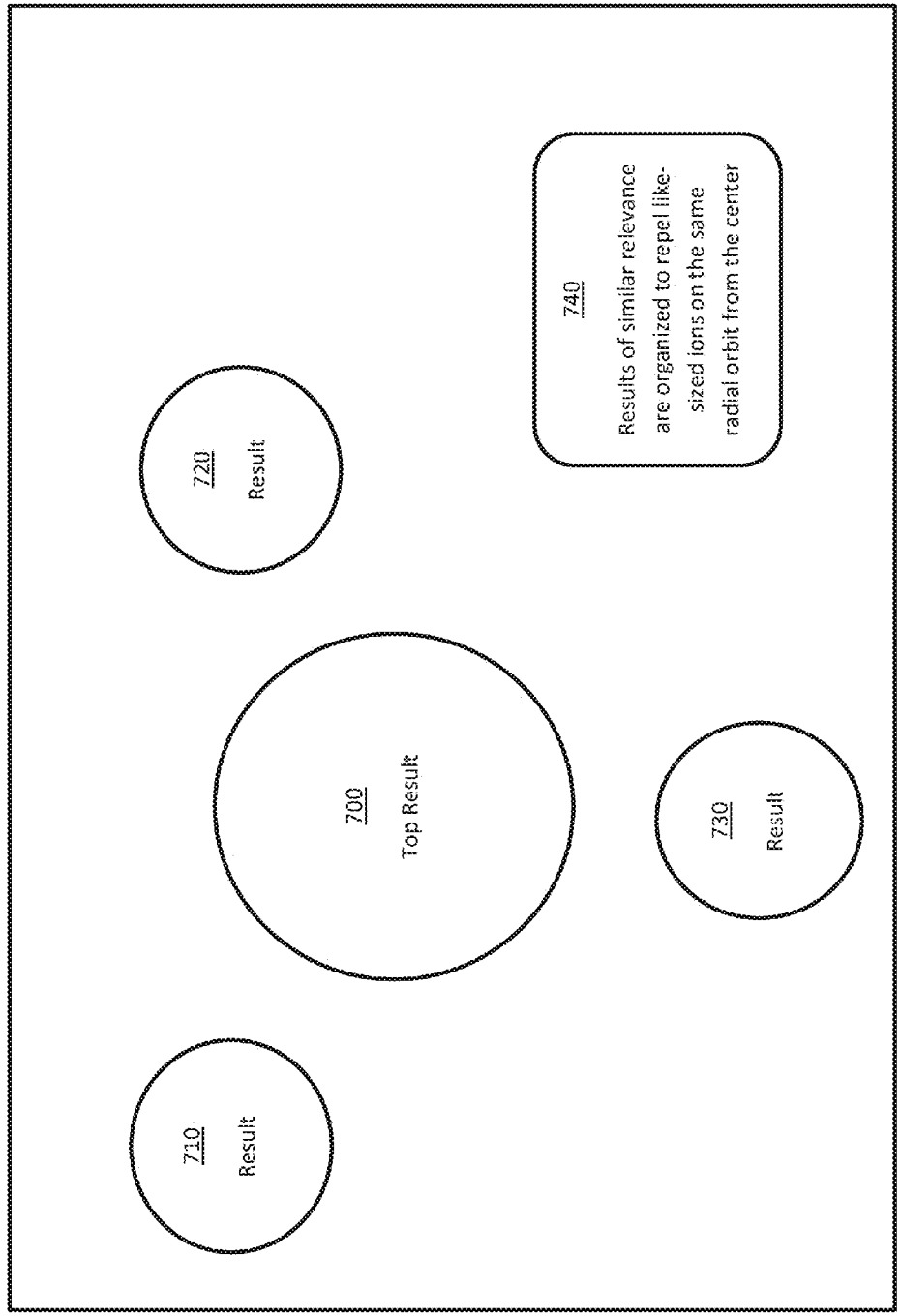
FIG. 11  Result Map   Repelling along the same radial orbit

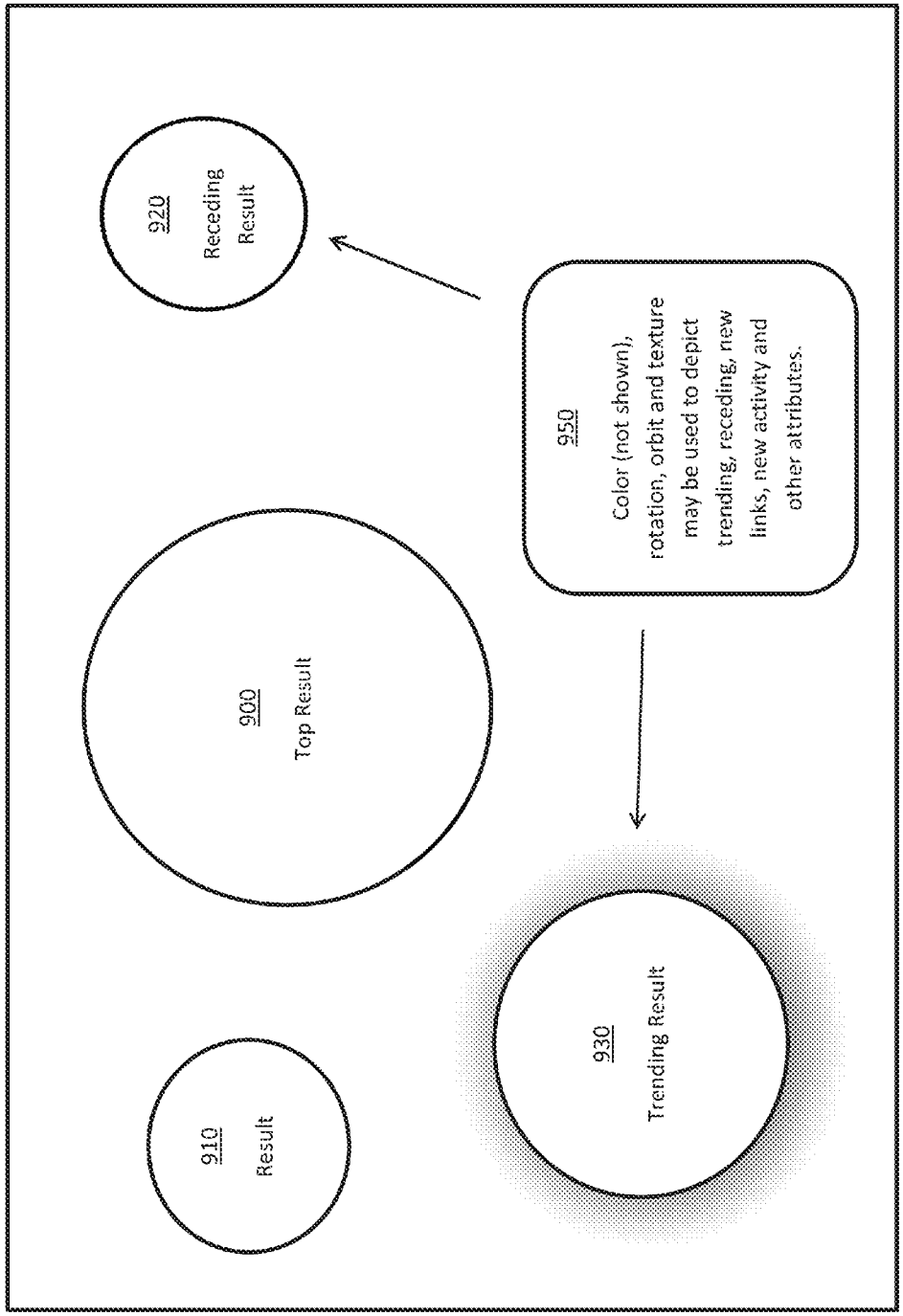
FIG. 12  Result Map  Trends, Color, Texture

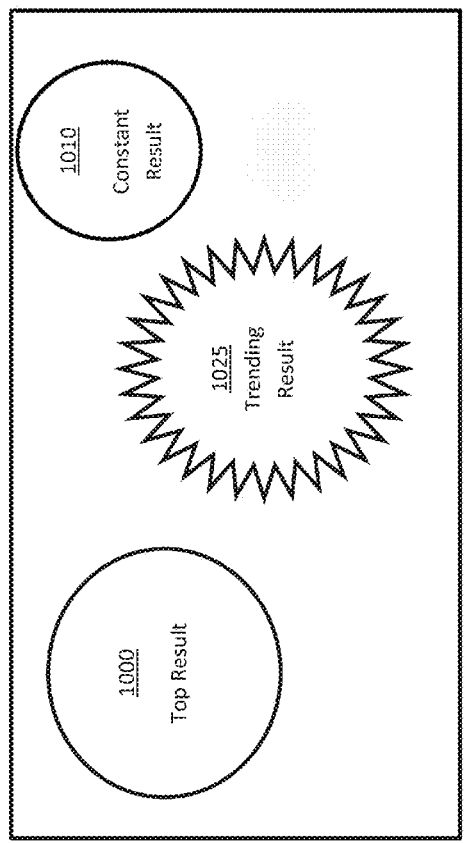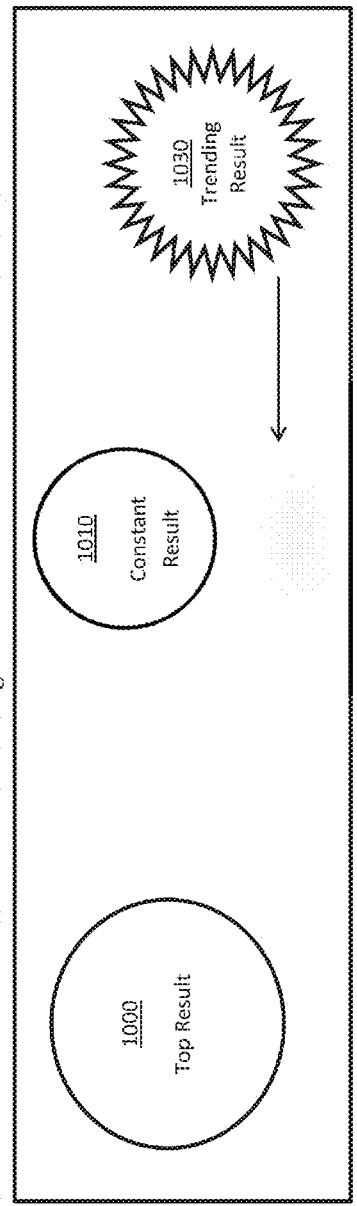

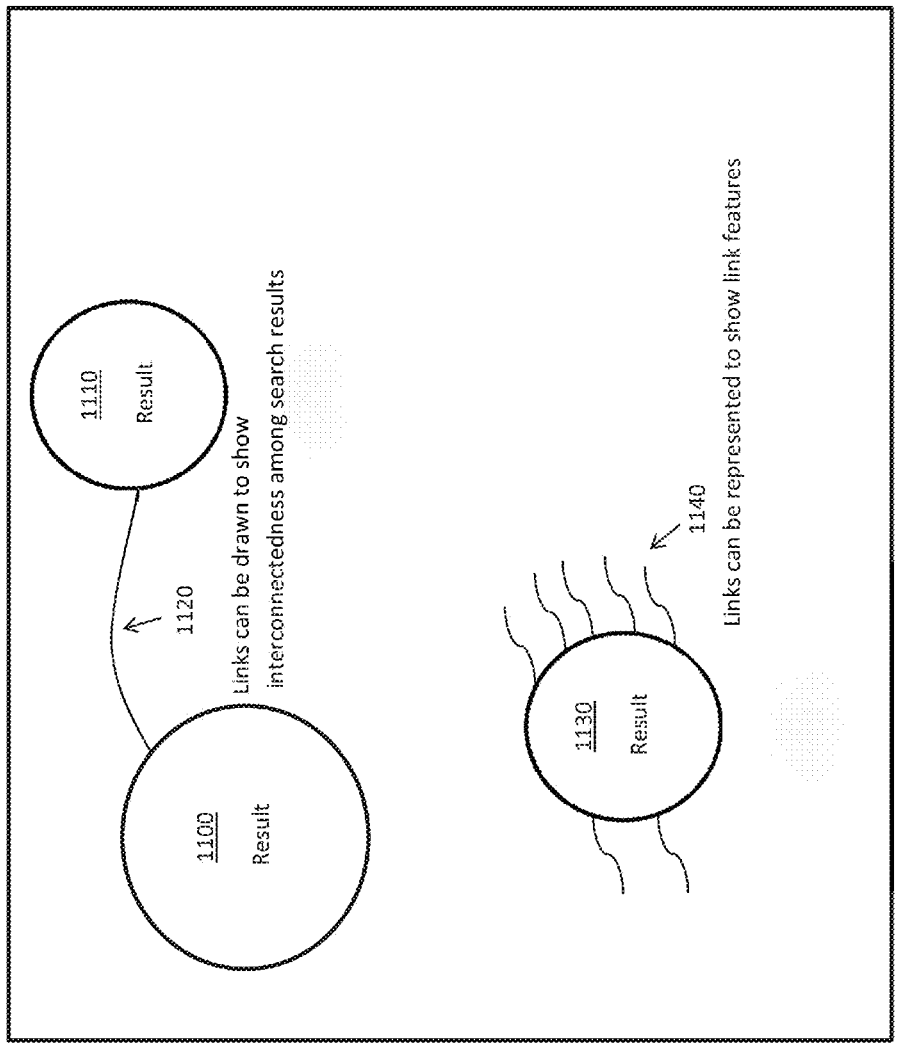

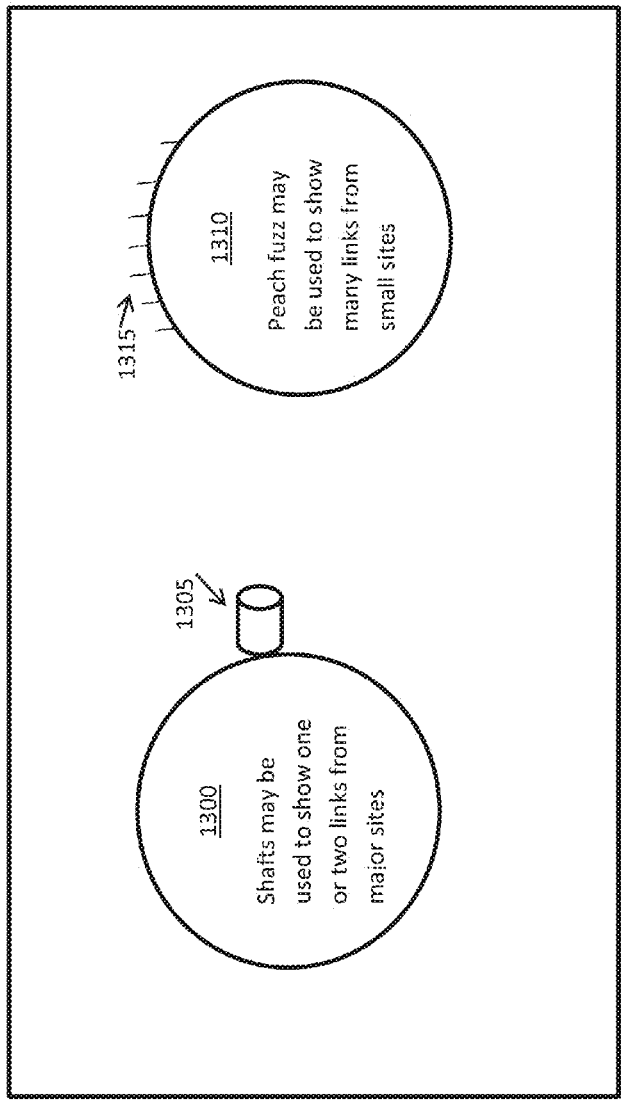

GALAXY SEARCH DISPLAY

CROSS-REFERENCE TO RELATED APPLICATIONS

This application is a utility application based upon U.S. patent application Ser. No. 61/351,986 filed on Sep. 7, 2011. This related application is incorporated herein by reference and made a part of this application. If any conflict arises between the disclosure of the invention in this utility application and that in the related provisional application, the disclosure in this utility application shall govern. Moreover, the inventor incorporates herein by reference any and all patents, patent applications, and other documents hard copy, electronically cited or referenced to in this application.

BACKGROUND OF THE INVENTION (1) Field of the Invention

The invention generally relates to means and methods of producing web search results upon a physical display. More particularly, embodiments of the invention relate to the artful presentation of web search results by use of display properties akin to planetary physics.

(2) The Related Art

Search display systems are known in the related art and typically provide linear lists of found websites or search results. Results deemed most relevant to a search are presented on top of a list and less relevant results are presented in descending order upon pages and pages of an ordered list. Other than list placement position, each presented search result looks similar to the next.

The related art fails to display the attributes of links pointing to a found site, other sites linking to the found site, or other qualitative attributes. The related art, with its textual list form of results, suffers from practical limitations as to the number of search results that can be meaningfully displayed.

The descending nature of textual results in the related art fails to disclose how individual results relate to one another on a variety of metrics. From a practical standpoint, the related art's text based result listings make low ranking results virtually invisible to typical users. Moreover, results with virtually identical characteristics necessarily must be ranked in sequential order, implying greater relative importance of higher ranked results than reflected in the underlying website characteristics. Textual results in the related art are shown in an ordinal ranked order, with no indication of matters of degree. A result that is listed in the fourth position, for example, may be only slightly more highly ranked than the next result in the fifth position. On the other hand, the result in the fourth position may be much more important than the result listed in the fifth position. Because an ordinal ranking scale is used in the textual display of results in the related art, these two unique scenarios would be displayed in the same depiction in the related art, thus masking potentially useful information about the relative importance of the fourth and fifth results. As another example, the first three results may be extremely important according to the given ranking methodology, with all other results much less important. In the textual results in the related art, this importance of the top three, and the relative unimportance of the next ninety seven, for example, is lost, with the user simply seeing textual, ordinal lists of results, completely unaware of the disparity in importance among results. In the present invention, the scenario described above would be depicted by displaying three large result icons near the center of the result map, and the remaining results appearing further away and as much smaller result icons, making it very easy for the user to see the similarity in ranking importance among the first three results, as well as the disparity in relative importance of the first three results versus the remaining results. As another example, one hundred results might be almost equally ranked. This hypothetical result list might look, in the textual results in the related art, no different from the result group wherein the top three are much more highly ranked, with an ordered list of one hundred results, with no indication that the first result is essentially no more highly ranked than the result listed in the hundredth position. Users, from a practical standpoint, would be unlikely to see any results beyond those listed in the first few pages of results, despite the relative equal importance of these unseen results. In the present invention, this scenario would be depicted by displaying one hundred similarly sized icons at similar distances from the result map center, making it very easy for the user to see that all the one hundred results are of similar importance according to the given ranking algorithm. In the present invention, matters of degree of ranking are visible to the user, who sees the size and relative positioning of each result as a reflection of relative importance according to the given ranking algorithm.

The one dimensional, ordinal ranking of search results of the prior art has become antiquated and fails to capitalize upon new forms of user interfaces, such as touch screen devices now found in phones, tables, laptops and even desktop computer environments. Search results of the prior art were designed to be viewed one page at a time and fail to contemplate the use of zoom, panning, pinch and other commands now used with touch screen technology.

The textual results of the prior art fail to reveal the reasoning of why a result is shown at a certain linear rank. In the prior art, a user cannot ascertain ranking methodology and does not know if a rank was achieved by a result having many low-value links or a few high-value links (or other attribute or attributes upon which the ranking algorithm is based).

Prior art textual results fail to disclose the trending or recent rank changes of a search result. For example, the prior art fails to show if a result has recently gained new links, has aging links, recent "likes" or +1 votes or other changing attributes not contemplated in the prior art. The prior art fails to allow a user to rewind displayed search results to ascertain which results have gained rank and which results have lost rank.

The prior art textual search result presentations eschew any display of link attributes. Thus, the prior art fails to show how one result is connected to another or the type or number of links coming or going from a result.

While there are several patents and patent applications addressing the display of search results, the shortcomings of the prior art discussed above remain unsolved.

U.S. Pat. No. 7,624,101 by Lin et al issued on Nov. 24, 2009 discloses a method of presenting phone numbers and map locations related to displayed search results.

U.S. Patent Publication 2005/0060287 by Hellman et al, published on Mar. 17, 2005 discloses a graph-theoretic structural analysis for creating clustered nodes and arrows to display search results. Hellman teaches the use of clusters, subclusters and nodes to allow a user to narrow search results by selecting from a series of presented clusters. Hellman discloses a "do it yourself" search display method requiring users to find data themselves. While Hellman presents interesting graph theory concepts, Hellman fails to address the prior art shortfalls of web search display.

U.S. Patent Publication 2008/0082578 by Hogue et al, published on Apr. 3, 2008 discloses a method of displaying time lines of events relevant to displayed search results. For example, in Houge if a search result was of a person, a timeline of events in the person's life might be displayed. But, Houge fails to consider the need to see prior search rankings or attributes of a displayed site.

U.S. Patent Publication 2008/0208819 by Wang et al, published on Aug. 28, 2008 discloses a graphical user interface based web search system and alludes to a Cartesian coordinate mapping system. But, Wang teaches away from the presentation of results disclosed herein and teaches refinements in eliciting a series of user inputs to more carefully define and develop a search string. Wang teaches the use of tags and search algorithms to ascertain the true search intentions of a user. Wang fails to improve upon the actual presentation of search results.

U.S. Patent Publication 2010/0125573 A1 by Venolia, published on May 20, 2010 discloses the presentation of hyperlinks in a search result list and does use graphs to chart web pages and hyperlinks. But, Venolia teaches the use of ordered lists in displaying search results. The ordered lists of Venolia do add various symbols to denote links between displayed results. The methodology of Venolia is limited to the use of ordered lists.

U.S. Patent Publication 2009/0228785 by Creekbaum et al, published on Sep. 10, 2009 discloses a software application for displaying data from a web service in a visual map. Creekbaum teaches the use of a user interface allowing users to create their own unique visual maps of objects upon a computer screen and then have the objects populated by use of specific web searches. Creekbaum is well suited toward users who want to create their own interesting presentations of information; however, Creekbaum fails to address the display of web search results in reaction to the typical consumer's normal search input.

U.S. Pat. No. 6,457,004 by Nishioka et al, issued on Sep. 24, 2002 discloses a topic word graph interface allowing users to find documents by selecting through topic words and following graphs. Nishioka presents an interesting interface facilitating an efficient search for information. But, Nishioka fails to address the presentation searches.

U.S. Pat. No. 7,921,379 by Ko, issued on Apr. 5, 2011 graphically displays further search categories in reaction to a user search. The two dimensional display system of Ko presents sub-categories or categories related to a user input. Additional search categories are presented until a user finds the desired subject. Ko acts as a graphical decision tree in assisting a user in deriving a search string. Ko uses two dimensional graphs to show the relative number of links mapping presented categories or sub-categories.

U.S. Pat. No. 6,810,402 by Bates et al, issued on Oct. 26, 2004 discloses means and methods of color coding search results. Bates colors words of search results, and presents search results in the ordinal form of the prior art.

BRIEF SUMMARY OF THE INVENTION

Embodiments of the present invention overcome shortfalls in the related art by presenting an unobvious and unique combination and configuration of processors, non-transitory computer readable mediums and storage devices, server devices, memory, databases and machine readable instructions executed by a computer system to present improved physical displays of search results.

Embodiments of the invention place search results in graphical form in the format of planets, spheres, circles or other figures. Search rankings and attributes of displayed results such as link characteristics may be displayed by various representations both static and dynamic. Both two dimensional and three dimensional search result representations are disclosed. Embodiments of the present invention are executed upon traditional screens, phones, tablets, touch screen systems and other electronic products.

As a product of searches, reported results may include social media pages, websites, web pages and other results and may be represented as dynamic objects, moving, orbiting and/or spinning as a result of changing result attributes or user commands. Graphical representations of search results are sometimes referred to as a "result map." Embodiments of various result maps include representations of multiple results with representations of link characteristics and representations of common links shared among two or more results. Lines of various size and color may be used to represent link attributes. In one embodiment, the absolute or relative age of a link may be shown by use of varying colors and the importance of a link may be shown by line thickness or use of various line patterns.

A links toggle feature may provide a user interface to allow a user to customize the presentation of link attributes. Links to other search results may be shown by use of lines to other result spheres, or link attributes may be displayed upon the representation of the result upon the display. For example, a result with a relatively large number of low rated links may be drawn with short thin lines to emulate peach fuzz, a result with many medium rated links may be drawn with thick spaghetti type lines and results with a few highly rated links may be drawn with a spiky emblematic depiction.

A ring view marshals groups of results within rank ranges and presents the result groups within concentric ring areas. This more standardized view helps users to systematically click through results and note color changes to previously reviewed links.

Search results and their respective attributes may be saved into various databases providing the underlying data displayed in result maps. Certain display rules, sometimes referred to as "laws," govern the depiction of search results on any given result map. The changing data gathered from the constantly changing World Wide Web or other search field, combined with the laws governing result map displays, create a dynamic result map in which changing characteristics of any particular found result are reflected graphically in the result map in terms of spatial arrangement, placement, size, color, changes over time and depicted links and other attributes.

In one embodiment, links or lines from a relatively important social media page, website or other object to a found result may be thicker and brighter as compared to lines or links from unimportant web objects. Important results themselves may be displayed to a user as a bright circle or sphere with size, mass or gravity in proportion to their respective importance.

One law governing the depiction of results in a result map is the concept of result or website gravity in which result mass or gravitation is used to graphically display the importance of results. The law of gravitation places any given set of results upon a result map such that the most important results are nearest the center of the result map. In order to use the full screen and enhance the user's ability to discern unique results, results are oriented such that results repel one another along the same orbital path. For example, important results, based on any given criteria, are displayed nearer the center of a display screen or result map, and are spaced to create maximum distance among results of similar orbital radius. Results repel one another, though this repelling force cannot move a result away from the center of the result map. In other words, the repelling force acts to disperse results along a result's circular orbit at a given radius from center, but cannot extend the radius or distance from the center of any given result. The relative rank of a result determines its radius from center, while the repelling force among results helps determine where the result sphere is placed on a given circular orbit. The repelling force helps improve the user's ability to see results by keeping the results more evenly dispersed throughout a result map. As between any two results, the result that is deemed more relevant to the given search is displayed closer to the center of a result map. Or, if the two are equally ranked, the results are displayed equidistant from the center. In addition, results repel other results along the same orbit. If, for example, one result is displayed at a radius from the result map of a given length, and were situated at a bearing of zero degrees, a second result of the same relative importance would be positioned with the same radial distance from the center of the result map, but with a bearing of 180 degrees. In the same hypothetical example but expanded to four results of equal relative importance, each result sphere would be displayed at the same radial distance from the center of the result map, but oriented with bearings at 0 degrees, 90 degrees, 180 degrees, and 270 degrees, or any other set of four bearings where the bearing of each result differs by 90 degrees from the nearest two drawn results.

Important results of greater mass are displayed toward the center of a result map. Results of less importance are drawn away from the center of the map. Each concentric circle or orbit may be comprised of similarly important results. Whereas in the approach of the related art textual result listings, several search results of identical characteristics would necessarily have to be ranked, erroneously implying greater importance of the sites or results ranked higher. With the ordinal nature of the textual results in the related art, matters of degree of ranking importance among results are not discernable. In the present invention, the relative size and distance from a result map center allow users to see not only ranking, but also relative ranking among results. The user may easily see that relative to one another, none of the several sites are more or less important. Like other user defined features of the system, the law of gravity may be adjusted, effectively eliminating the effect of the law on a particular result map, potentially providing the user new insight in interpreting the results of their search.

Embodiments of the present invention depict several results as spheres arranged in a circle or orbit around the center of a result map. In one embodiment, a user adjusted or user tuned feature of "families" of results comprised of found results sharing one or more user defined attributes, are displayed as clusters of results with less highly ranked results being shown orbiting the most highly ranked result in the family of results. These family clusters depicted in a manner akin to solar systems that together comprise a galaxy. One embodiment would place family clusters that taken as a group are more highly ranked than other family clusters, based on user adjusted or user tuned criteria, closer to the center of the result map with less highly ranked family clusters positioned further from the center.

In one embodiment, newer links may be green, for example, with older links being shown in yellow or orange, or some other color to differentiate from the newer links. Inbound links may be different from outbound links. For example, a link upon a displayed result pointing to another web object may be considered an outbound link and may be shown with stars or arrowed lines pointing to the web object. A link from another web object pointing to a displayed result may be considered an incoming link and may be represented with arrowed lines pointing to the displayed or found result.

Embodiments include zoom and pan features allowing a viewer to pan to different areas of a result map and then zoom in or focus upon smaller result spheres so as to take full advantage of a viewer's screen size and resolution. Conversely, a scaling function may allow a viewer to back away from shown results to see a much larger section of a result map. A view showing greater portions of a result map may be called a constellation view. This zooming feature has the practical effect of allowing a user to see potentially hundreds, or even thousands, of search results upon one result map, and to spot, based on color, size, movement or other features, relatively remote results which, while important to the individual user, would be practically invisible in the related art's text based results display because they would be so deep in the list of results.

Another disclosed dimension to a disclosed result map is time. When viewing search results, a searcher may slide a time scale from the present time to a past time and observe the movement of represented results as such results change in importance. Real time changes in results may also be observed such that results with growing importance may be seen, albeit slowly, gaining in size and center position.

Other disclosed graphics include the use of charts and tables to display and compare result attributes such as numbers of links, age of links, and other metrics. Such information may assist a user in deciding how to adjust the system's default definition of result importance. A user may adjust the system settings to give higher ranking to results with new incoming links, incoming links from certain types of websites or web objects, and other user defined attributes.

Embodiments of the invention may also be used in conjunction with social media sites wherein individual accounts may be viewed as spheres or planets or other symbols and clustered by importance. Result maps may depict relationships and interconnections between social media account holders. In such applications, the concept of time reporting allows the user to track perceived popularity or importance of a given account in relation to other events, such as an album release, celebrity wedding, election, or any other occurrence that creates a change in account activity. A trending account, for example, might be seen to grow on the result map and move towards the center and change color, especially if the time component is used to "rewind" the map.

Embodiments of the invention overcome shortfalls in the related art by eschewing the display of lines of text and ordinal listings of search results. Unlike the prior art, the present system displays high ranking search results as large spheres illustrated upon or near the center of a result map. As a user views the result map in any direction away from the center, smaller spheres, icons or other result insignia will be observed. The smaller spheres may be viewed or explored in either two or three dimensions. The smaller spheres depict search results lower in rank as compared to the larger spheres having a more centered position.

Embodiments of the invention overcome shortfalls in the prior art by use of touch screen interfaces wherein a user, using a tablet or similar device, may deploy touch commands or movements to explore results of interest. A user may pan to outer locations and then zoom in for a closer view. The user in effect walks or explores in a virtual space of search results. In traveling or viewing various results from various perspectives, sphere spin, color, brightness, and sphere relationships may be observed. Search results trending in a positive direction may be seen as fire-hot spheres. The virtual space view of search results lacks the seams and limitations of the page results of the prior art. The disclosed system presents a far more engrossing and engaging experience not found in the prior art.

Characteristics of displayed results are illustrated to convey larger amounts of information and enhance a user's ability to analyze data. By the artful use of such variables as color, spin, rotation, surface texture, gravity, gravitation of large spheres toward the center, concentric sphere planes and other presentation methods, a user may quickly grasp a great deal of information in a quick view. For example, the above variables may be populated with result attributes such as user visits, keyword density, "likes,"+1 activity, value and quantity of incoming or outgoing links and other values. The user may hover, click or tap on a result sphere to see attributes of the result, or additional information, including textual information, selected from the result.

By use of two and three dimensional result maps, multifaceted result spheres or icons, system gravity and a center screen sweet spot for high ranking search results, the presentation of search results becomes a living environment that is interactive and engaging. The optional use of touch screen technology further enhances a user's actual feel of the search result environment. With the addition of the rewind feature, where prior states of result variables are presented, a user may viscerally feel the effects of time upon search results.

Disclosed embodiments focus upon the artful and improved presentation of search results and do not attempt to act as a search engine or web crawler. The disclosed embodiments are not dependent upon a particular methodology in assigning rank.

These and other objects and advantages will be made apparent when considering the following detailed specification when taken in conjunction with the drawings.

BRIEF DESCRIPTION OF THE DRAWINGS

FIG. 9 depicts a result map with various illustrations of results
FIG. 10 depicts a result map showing two results of equal rank equidistant from the map center
FIG. 11 depicts a result map showing three results of equal rank in a repelling mode
FIG. 12 depicts a result map with various result illustrations
FIG. 13A depicts a result map with a trending result shown in present time
FIG. 13B depicts a result map with a trending result in a lower ranking position in a past time
FIG. 14 depicts a result map with various link embodiments
FIG. 16 depicts a result map with various link embodiments

DETAILED DESCRIPTION OF EMBODIMENTS OF THE INVENTION

Figure 1:
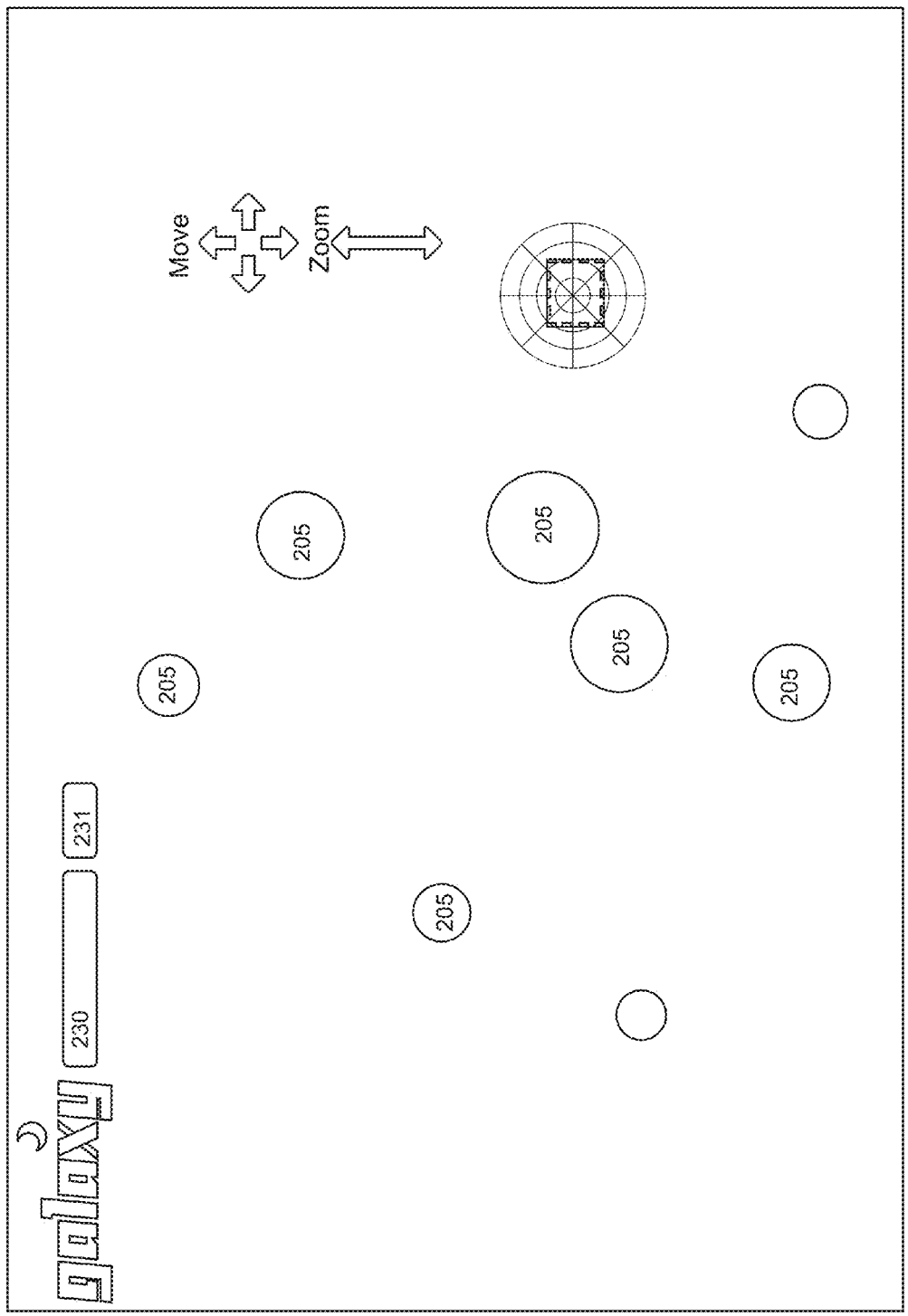
FIG. 1 depicts a result map in a in a neutral or default mode

The following detailed description is directed to certain specific embodiments of the invention. However, the invention can be embodied in a multitude of different ways. In this description, reference is made to the drawings wherein like parts are designated with like numerals throughout.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed herein. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

REFERENCE NUMBERS 100 is a non-transitory machine readable storage medium containing machine readable instructions, the instructions not being signals
110 is a processor coupled to the non-transitory machine readable instructions
120 a search string accepted from a user of the system
130 a third party search engine accepting the search string 120
140 search results obtained from the third party search engine 130
150 positioning engine, transforms the search results 140 into positions based upon selected views and other selected user options
160 a shape rendering engine, transforms positional data from the positioning engine into a screen input
170 a screen sometimes accepting screen input from the shape rendering engine
200 a top level search result illustrated at or near the center of a result map
205 a search result in general
206 a search result shown in a spiral mode or spiral display 210 a plurality of secondary or second tier search results illustrated in radial fashion around a top level search result 200
220 a global map illustrating the relative position being viewed
230 an input area for entering search commands or search strings
231 an enter command area
240 a zoom command area
250 a pan command area
300 is a top ranking search result illustrated at or near the center of a result map
310 is a non-top ranking search result shown away from the map center, the search result displaying a keyword
320 a representation of a viewing area displayed to a user
330 a map area just outside of the current viewing area 320
340 another embodiment of a zoom and pan control area, sometimes used with touch screen technology
400 a control block showing or representing a user entering a text string to perform a search
410 a control block showing the retrieval of search results from a third party search engine
420 a control block showing the transformation of search results into machine readable instructions to be passed to block 430
430 transformation of search results into newly positioned and newly created result renditions, sometimes called a code manager or galaxy manager
440 a shape rendering engine transforming positional results to screen input
450 a display screen
500 a top level search result, trending upwardly and positioned in the center portion of the display
510 a mid-level search result
510 a low-level search result shown to the outside of the center portion of a display
600 a top search result
610 a search result of equal rank to search result 620
620 a search result of equal rank to search result 610
630 an explanation of FIG. 10
700 a top rank result
710 a result in the same radial orbit as two other results
720 a result in the same radial orbit as two other results
730 a result in the same radial orbit as two other results
740 an explanation of FIG. 11
900 a top rank result
910 a result
920 a receding or fading result moving to a lower rank over time
930 a trending result moving to a higher rank over time
950 an explanation of FIG. 12
1000 a top rank result
1010 a search result of a constant rank
1025 a trending result of rising rank, shown near a top result
1030 a trending result of rising rank, shown before moving near a top result
1100 a result with a link 1120 to another result 1110
1110 a result with a link 1120 to result 1100
1130 a result having links 1140
1140 links shown to represent link features associated with result 1130
1200 a result with an actual link 1220 to another result 1210
1210 a result shown with a link 1220 to another result 1200
1220 a link between result 1200 and result 1210
1230 a result having links described in text
1240 a result having a few links from large sites shown as spiky links
1300 a result showing one shaft 1305 to depict one or two links from major websites
1305 a shaft used to represent one or two links from major websites
1310 a result with peach fuzz 1315 used to represent many links from small websites or websites of lower rank
1315 peach fuzz or thin lines placed upon a result, the peach fuzz used to represent many links from small websites or web objects or web objects of lower rank.

The terms "search results" and "web objects" are sometimes used to refer to websites, social media sites, user accounts, webpages, websites and other web objects found in a search.

The term "outside web objects" is sometimes used to refer to web objects not included within a display of search results. Links to or from an outside web object are sometimes considered in the ranking or display of a search result.

The term "results" is sometimes used to refer to search results as displayed in a manner consistent with the principles of the invention.

FIG. 1 depicts an edited screen shot of a default or natural map view. Search results are sized and positioned in correlation to their ranking. Top level results may be seen in the center foreground and lower ranks of results may be seen in the peripheral background. The view of FIG. 1 is the antitheses of the prior art wherein ordinal search displays provide no information as to the rank disparity between displayed results. A string of characters may be entered into a search box 230 and the user may press an enter button 231 icon. General search results 205 are shown sizes proportional to their relative ranking.

Figure 2:
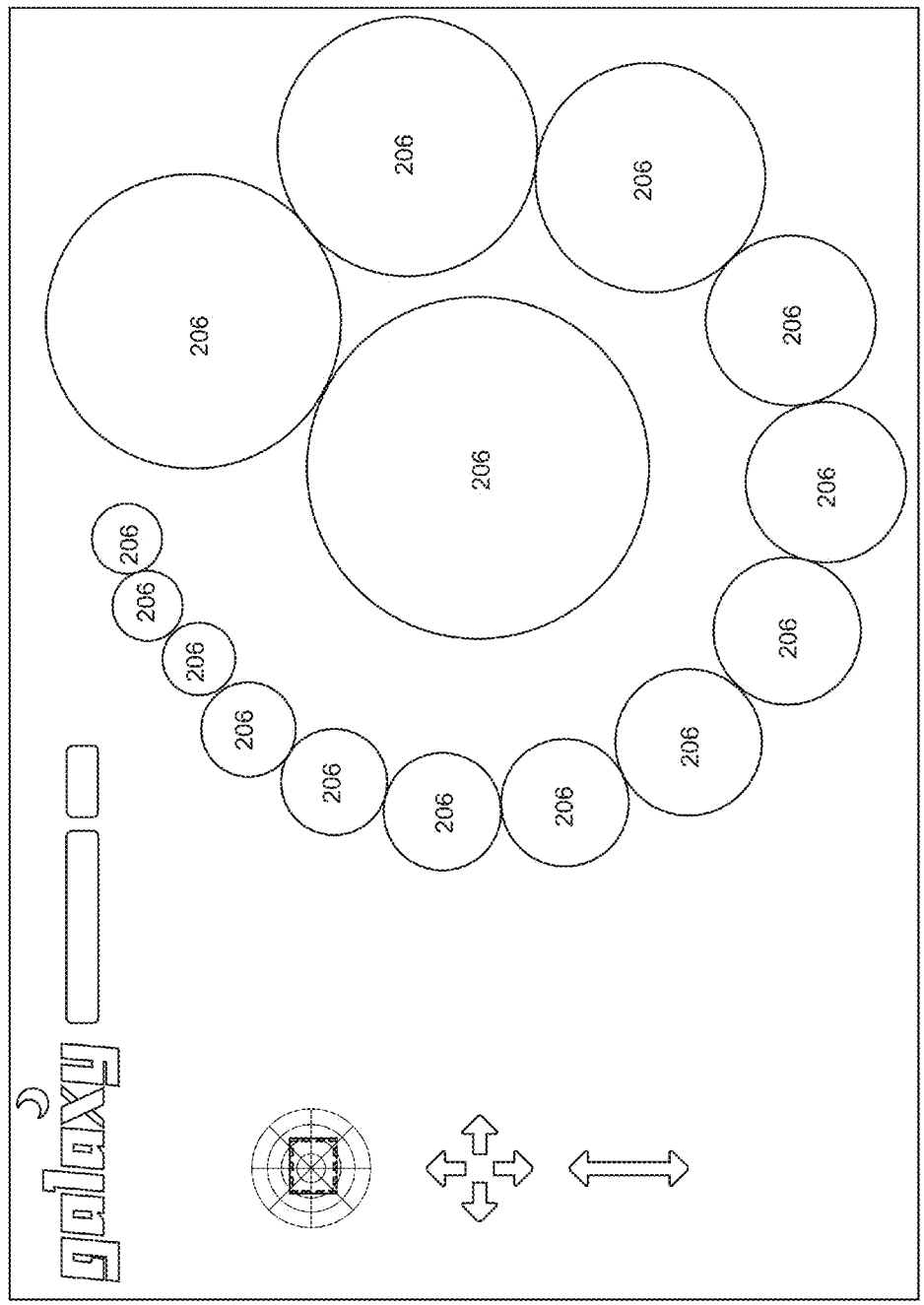
FIG. 2 depicts a result map spiral mode

Referring to FIG. 2, an edited screen shot is depicted wherein search results 206 are presented in a spiral form or in spiral mode with the top ranked result in the center and lower ranking results are depicted in a spiral formation in descending size to correlate to descending rank. Matters of degree in importance are shown by size of each sphere and distance from center.

Figure 3:
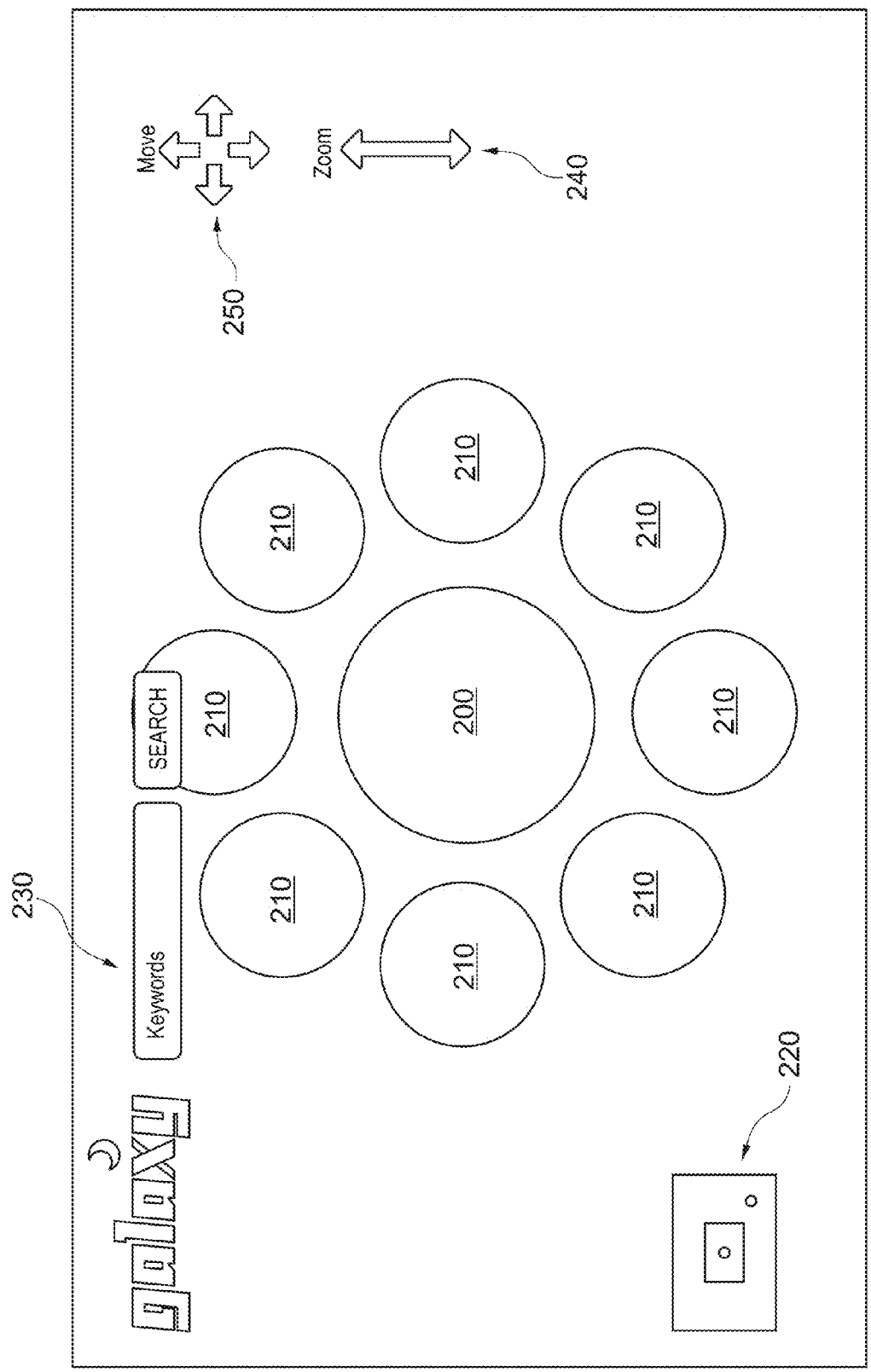
FIG. 3 depicts a result map in a concentric circle mode
Figure 4:
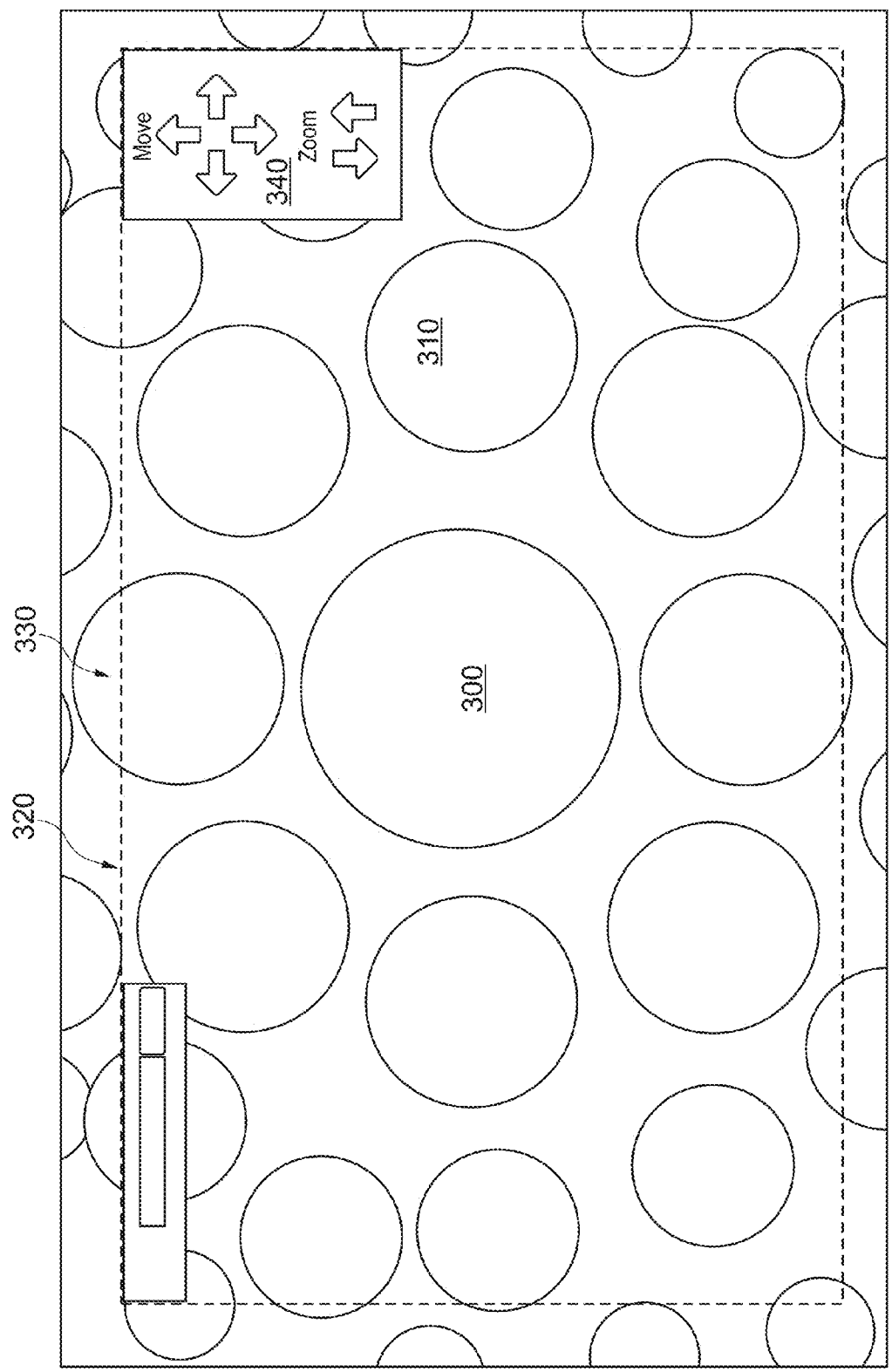
FIG. 4 depicts a result map in a concentric circle mode

FIG. 3 depicts an edited screen shot of a planetary map view wherein a top result 200 is in the center of the map and is surrounded by second tier results 210. The second tier results repel one another such that they are equidistant from each other and the top result 200. While the second tier results 210 are displayed as having equal rankings, their numeric ranking are most likely different from one another. The second tier results 210 may be considered "like results" that are somewhat equal in rank value. System setting may be adjusted to set ranges of rank values to be shown as like results and displayed within a concentric circle or orbit. While the view of FIG. 3 presents a less accurate view of result ranks as compared to FIG. 1, some users find FIG. 3 to be easier to use for certain purposes. FIG. 4 presents a top rank search result 300 in the middle of a screen viewing outline 320. Results of less rank 310 are shown to the side of the top rank search result. The search results may display various key words.

Figure 5:
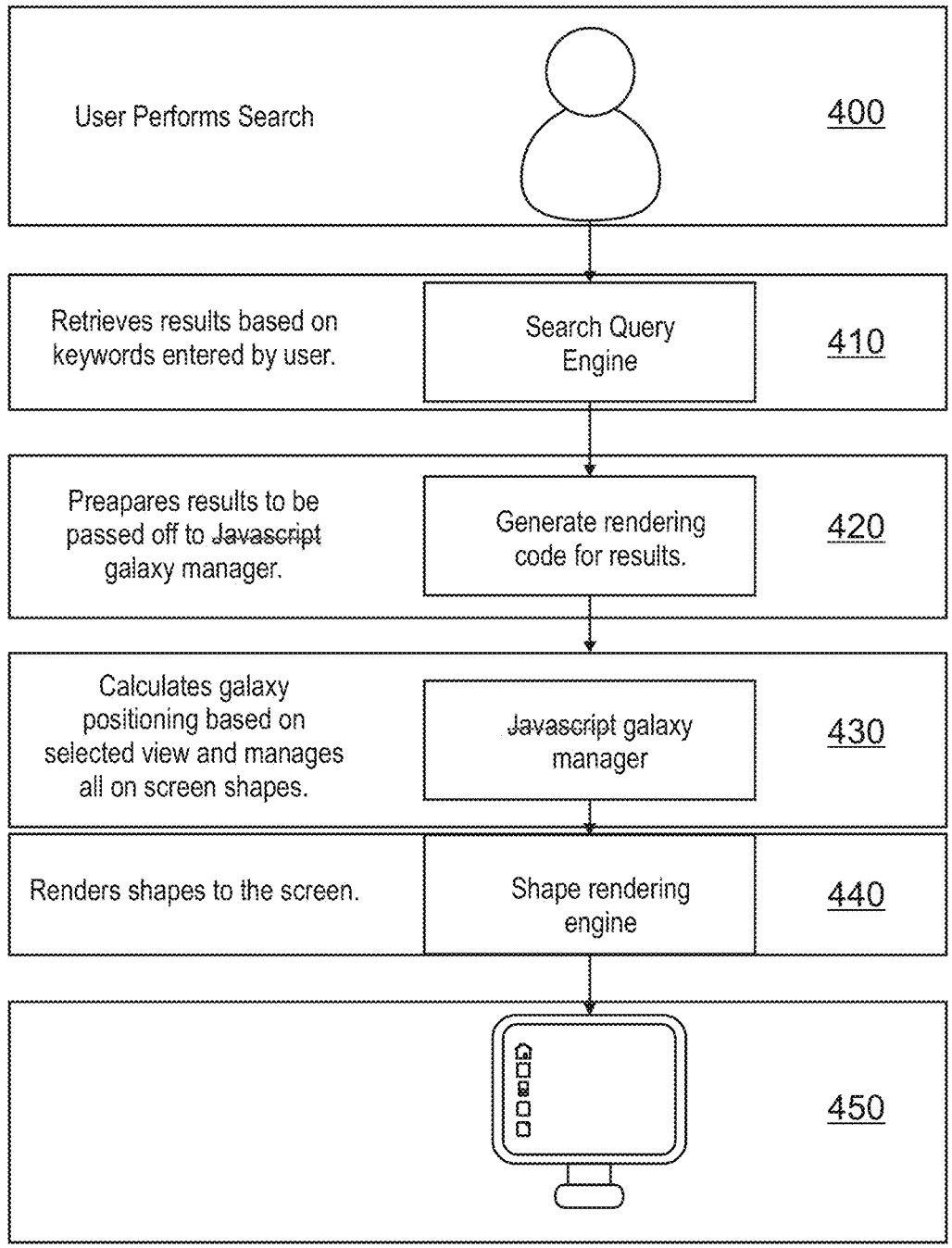
FIG. 5 depicts a flow chart of executing invention embodiments

FIG. 5 presents a flow chart of control blocks or components wherein a user performs a search 400, entering a search string sent to a search engine with search results 410 retrieved, the search results then transformed within control block 420 wherein the search results are transformed into new machine readable instructions suitable for delivery to control block 430. Within control block 430 new search result positions, attributes and appearance qualities are created. A component within control block 430 is sometimes called a code manager or galaxy manager. Data further transformed within the code manager is entered into a shape rendering engine wherein data is further transformed into screen input. The screen input is sent to a display screen 450, the display screen being a touch screen or a traditional display screen with external input devices.

Figure 6:
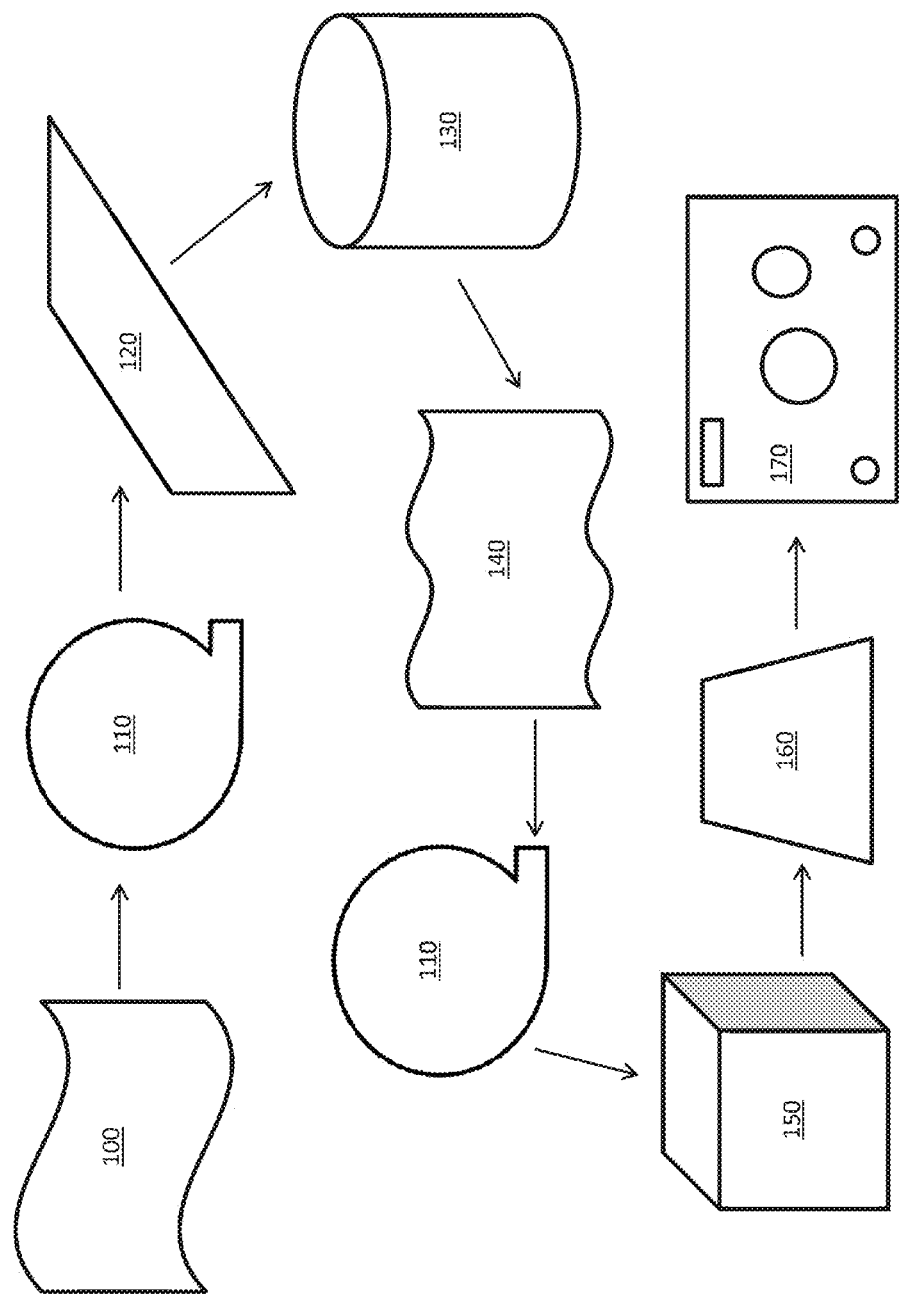
FIG. 6 depicts machines and machine readable instructions executing transformations and invention embodiments

FIG. 6 depicts and describes various machines and machine implemented transformations starting with a search string and resulting in a new and tangible display of search results.

A non-transitory machine readable storage medium 100 containing machine readable instructions is sometimes coupled to a processor 110, such as a computer processor. The computer processor 110 may create a visual display having an input area to accept a search string 120 from a system user. The search string 120 may be sent to a third party or internal search engine 130. The search engine may return search results 140 and the search results may be sent back to the processor for further transformations per the methods described within the machine readable instructions contained within the non-transitory machine readable storage medium 100. The processor 110 may then send instructions and transformed data to a positioning engine 150 wherein search results may be transformed into display positions, the display positions based upon selected views and other user selected options.

A shape rendering engine may accept input from the positioning engine and may transform positional data and instructions into screen input. A screen 170 may display the screen input sometimes generated by the shape rendering engine 160.

Figure 7:
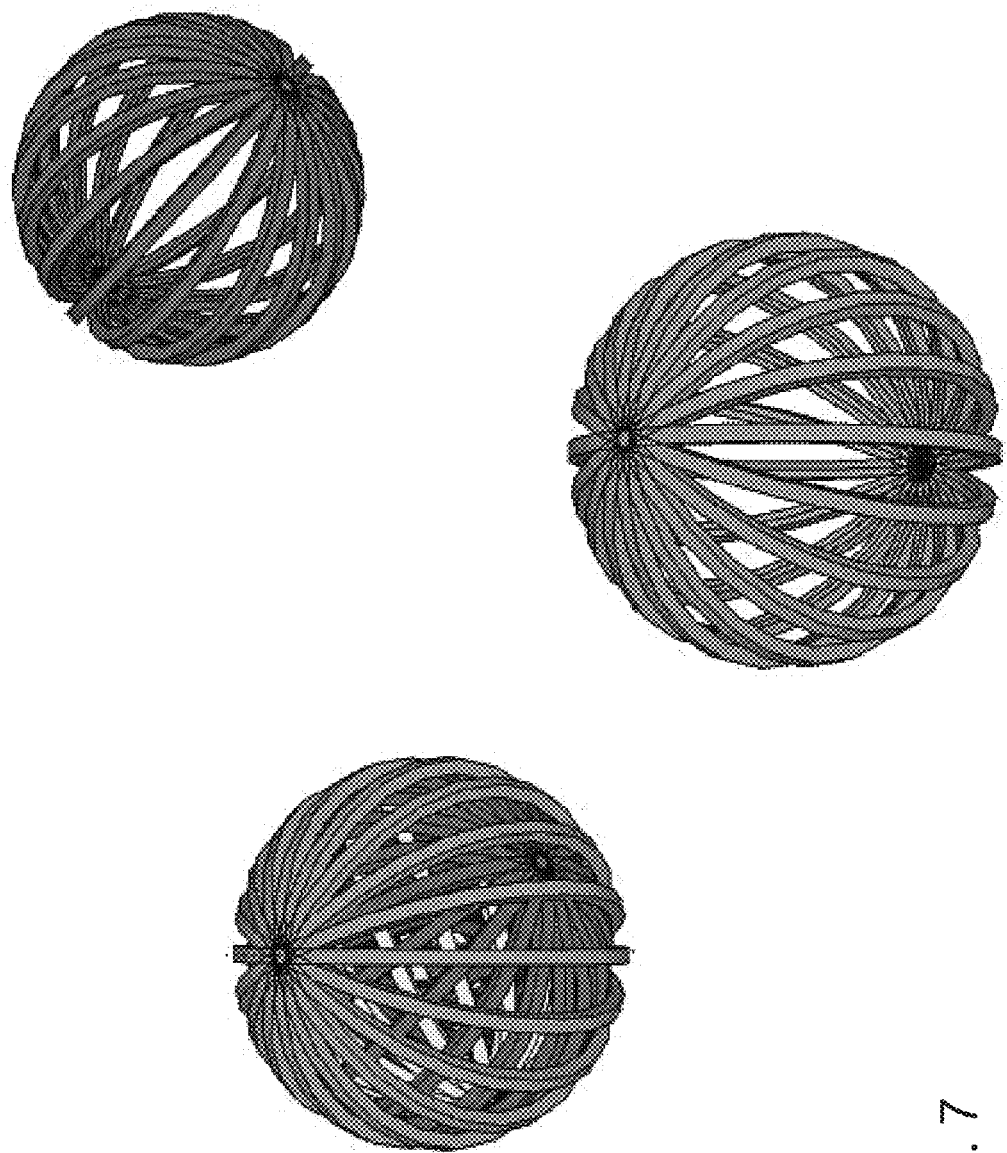
FIG. 7 is a perspective view of several displayed results shown in alternative textures

FIG. 7 depicts search results illustrated in spheres having alternative textures and attributes. Search results may comprise social media sites, social media accounts, social media account holders, web based applications, websites, webpages and other web objects.

Figure 8:
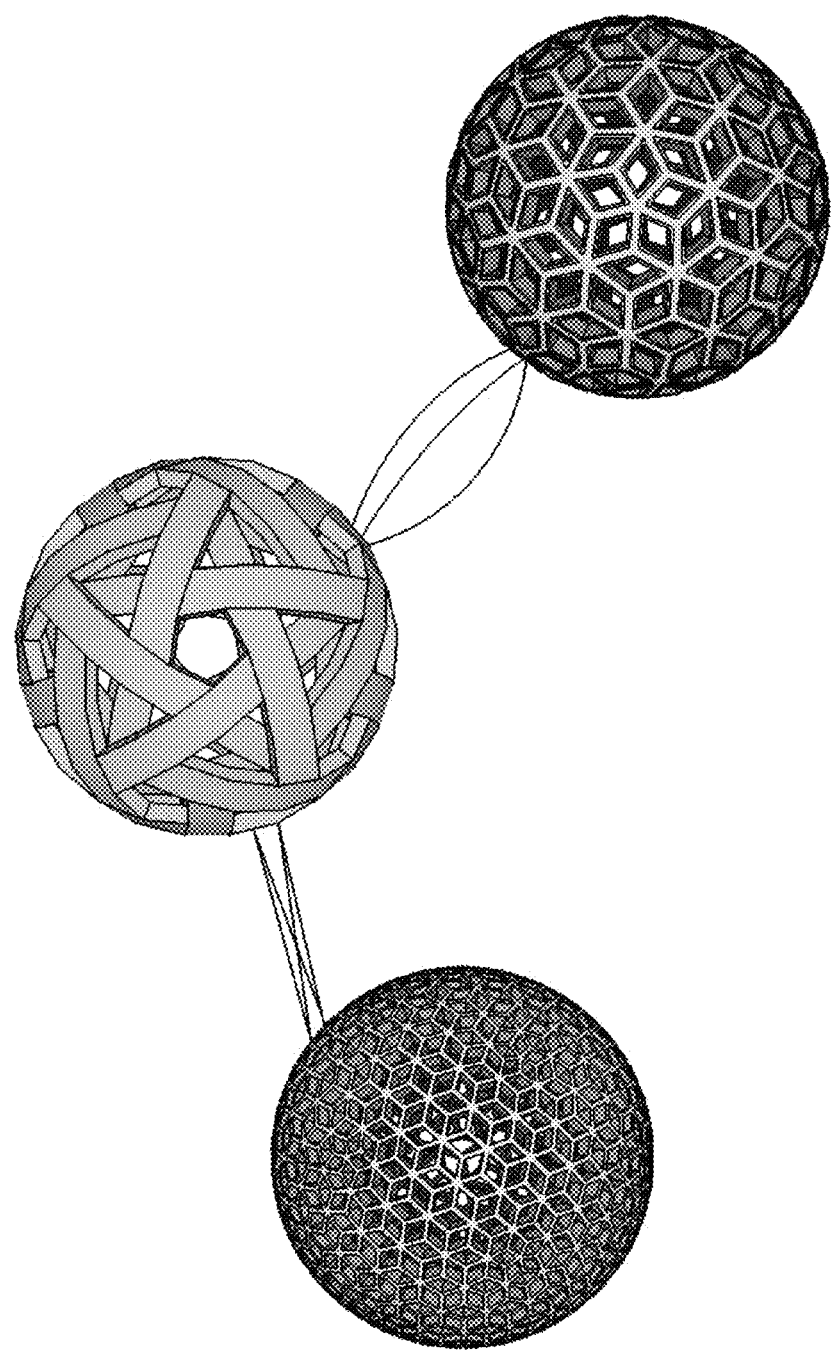
FIG. 8 is a perspective view of displayed results with links shown in alternative textures

FIG. 8 presents three sphere illustrated websites or search results with various links shown in either straight or curved lines. The drawings or descriptions herein do not limit the use of other artwork to illustrate results, links, and other attributes.

FIG. 9 depicts a result map having a top result 500 illustrated in a star shape. In this example the star shape is used to show a search result 500 that is upwardly trending over time. A mid-level result 510 is illustrated in an alternative star shape and a lower-level result 520 is illustrated as circle or sphere.

FIG. 10 depicts a result map demonstrating various gravity physics or properties. A top result 600 is shown in a center position and drawn larger than two lower ranking results 610 and 620. Block 630 explains that results of similar relevance are organized at similar distance from the result map center. Lower ranking results 610 and 620 are equidistant from each other and the top result 600.

FIG. 11 depicts a result map with a top result 700 and three lower level results 710, 720 and 730. The lower level results repel one another along the same circular orbit such that the lower level results are equidistant from each other and the top result 700. The lower ranking results 710, 720, and 730 may be considered to be in a concentric circle away from the center result. Lower ranking results may also be illustrated or positioned in concentric orbits or spheres outside of the top result.

FIG. 12 depicts a result map explaining at block 950 that color (not shown) rotation, orbit and texture may be used to depict trending, receding, new links, new activity and other result attributes. A top result 900 is shown having mass or size larger than other results. A trending result 930 is illustrated as hot or upwardly ranking by use of line blur at the perimeter. A receding result 920 is shown in a circular configuration.

FIG. 13A depicts a result map with a trending result 1025 shown near or adjunct to a top result 1000. A constant result 1010 is shown for a reference point for both FIGS. 13A and 13B. FIG. 13A shows a present time view, while FIG. 13B presents a rewind view or rewind feature wherein the past position of the trending results 1030 is shown at a great distance from the top results. The use of the rewind feature helps a user see which results or websites are trending upwardly or downwardly in rank.

The displayed rank of a website or search results may be derived from user selected attributes such as the number of links pointing to a site, the number and quality of search terms within the site, the age of links pointing to the site and other factors.

FIG. 14 depicts a result map illustrating a result 1100 having a drawn link 1120 to another result 1110. The drawn link may represent a hyperlink between sites 1100 and 1110. Result 1130 is shown with wavy link lines 1140. Such wavy link lines may be used to show either the quality and/or quantity of links.

Figure 15:
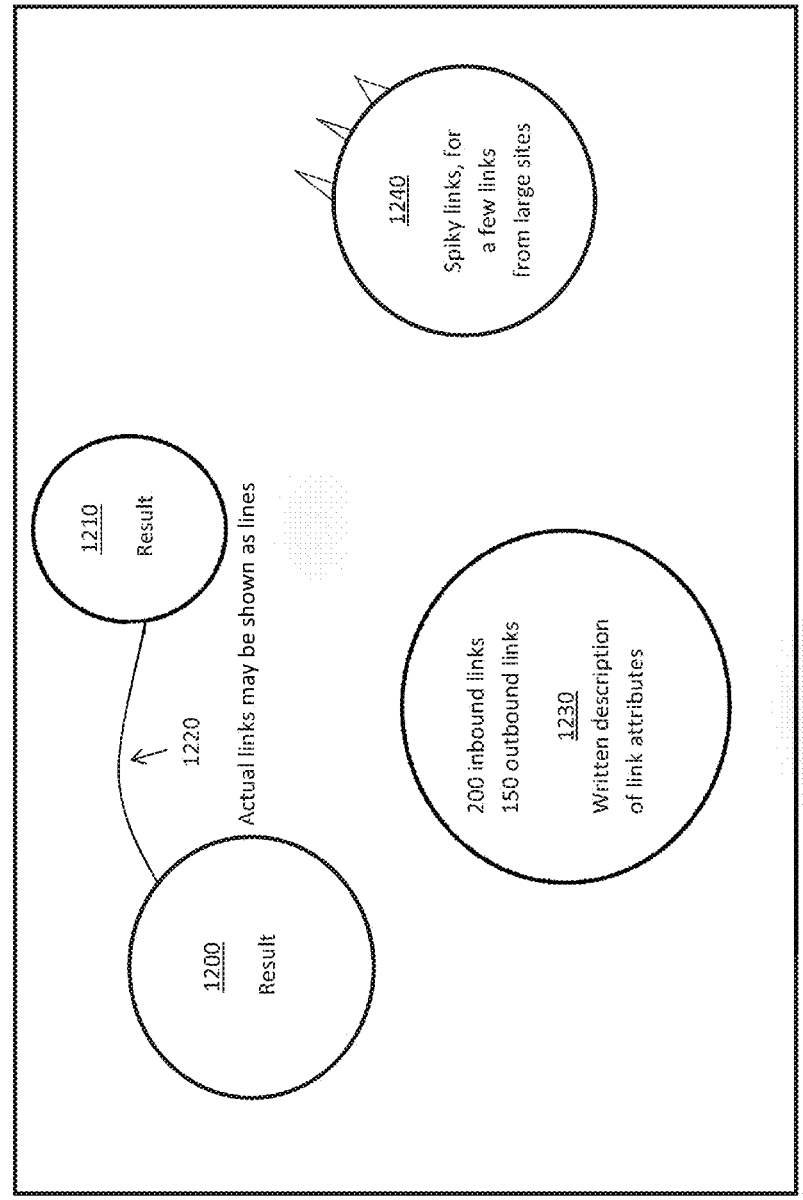
FIG. 15 depicts a result map with various link embodiments

FIG. 15 depicts additional methods of illustrating links of displayed results such that users may quickly see the characteristics of the subject links. Line link 1220 shows a direct link between result 1200 and result 1210. Often, the illustration of such direct links 1220 is impractical and other methods of showing link information is needed. For example, result 1230 contains written descriptions of the number of both inbound and outbound links. Result 1240 uses spikey lines to denote a few links from large or highly ranked web objects.

FIG. 16 presents further methods of illustrating link attributes. Result 1300 uses a shaft 1305 to denote one or two links from major or well ranked web objects. Result 1310 uses peach fuzz 1315 or thin short lines to reflect many links from small or lower ranked web objects.

Embodiments of the invention include the following items.

Item 1. A system presenting search results upon a physical display, the system comprising:

a) a non-transitory machine readable storage medium containing machine readable instructions;

b) a processor coupled to the non-transitory machine readable storage medium, the processor executing the machine readable instructions to cause the processor to:

present an input interface upon a display screen to accept user input of a search string;

transmit the search string to a search engine;

accept search results from the search engine, the search results including rank values;

transform the search results into representative icons with the icons having non-linear positional, size, shape, color, and decorative properties, the positional properties, size, shape, color, and decorative properties adjusted by user selected options;

transform the non-linear positional, size, shape, color, and decorative properties into screen input; and, transmission of the screen input to the display screen.

Item 2. The system of item 1 including machine readable instructions causing the processor to generate a center point upon the display screen and causing each icon to be displayed at a distance from the center point in proportion to each icon's corresponding search result rank.

Item 3. The system of item 1 including the illustration of each icon in a size proportional to each icon's corresponding search result rank.

Item 4. The system of item 1 including the display of icons arranged upon the display screen at an angle from the center point to maximize the distance between icons representing like ranked and similarly ranked search results.

Item 5. The system of item 1 including the display of icons in a ring view, such that icons are grouped within ranges of ranked values and each grouping is displayed within a set radial distance from the center point.

Item 6. The system of item 1 including the display of links entering or exiting search results, with different colors used to depict different link ages.

Item 7. The system of item 1 including the display of links entering or exiting search results, with lines drawn between search results and other web objects.

Item 8. The system of item 1 including the display of characteristics of links entering and exiting search results, the display of link characteristics comprising an emblematic representation of link attributes.

Item 9. The system of item 8 including emblematic link representations comprising relatively light and short surface lines to depict a relatively large number of lower rated links and emblematic link representations comprising relatively heavy and long lines to depict a relatively small number of highly rated links.

Item 10. The system of item 1 wherein the physical display presents a zoom, pan and pinch interface, an attributes toggle interface changing the presentation of attributes including link attributes of results and a rewind interface presenting changes in result positional properties, size, shape, color, and decorative properties as a function of time.

Item 11. A computer implemented method, using a processor, server device, non-transitory machine readable medium, one or more data bases and memory for presenting search results upon a physical screen display, the method comprising:

a) using a non-transitory machine readable storage medium for containing machine readable instructions;

b) using a processor coupled to the non-transitory machine readable storage medium, the processor executing the machine readable instructions to cause the processor to:

using a server, present an input interface upon a display screen to accept user input of a search string and using memory and a database, store the user input search string;

transmit the search string to a search engine;

accept search results from the search engine, the search results including rank values;

transform the search results into representative icons with the icons having non-linear positional, size, shape, color, and decorative properties, the positional, size, shape, color, and decorative properties adjusted by user selected options;

transform the non-linear positional, size, shape, color, and decorative properties of the icons into screen input; and transmission of the screen input to the display screen.

Item 12. The method of claim 11, including the step of generating a center point upon the display screen and displaying each represented search result at a distance from the center point in proportion to the search result's rank and displaying each search result in a size proportional to a search result's rank.

Item 13. The method of claim 11 including the step of arranging results upon the display screen at an angle from the center point to maximize the distance between like ranked and similarly ranked search results.

Item 14. The method of claim 11 including the step of representing search results in a ring view, such that represented search results are grouped within ranges of ranked values and each grouping is displayed within a set radial distance from the center point.

Item 15. The method of claim 11 including the display of links entering or exiting search results, with different colors used to depict different link ages.

Item 16. The method of claim 11 including the display of links entering or exiting search results, with lines drawn between search results and other web objects.

Item 17. The method of claim 11 including the display of characteristics of links entering and exiting search results, the display of link characteristics comprising an emblematic representation of link attributes.

Item 18. The method of claim 17 including the step of displaying emblematic link representations comprising relatively light and short surface lines to depict a relatively large number of lower rated links and emblematic link representations comprising relatively heavy and long lines to depict a relatively small number of highly rated links.

Item 19. The method of claim 11 including the step of presenting a zoom, pan and pinch interface upon the display.

Item 20. The method of claim 11 including the step of presenting an interface upon the display, the interface allowing a user to review changes in search result attributes as a function of time.

What is claimed is:

1. A system presenting search results upon a physical display, the system comprising:
   a) a non-transitory machine readable storage medium containing machine readable instructions;
   b) a processor coupled to the non-transitory machine readable storage medium, the processor executing the machine readable instructions to cause the processor to:
   i. present an input interface upon a display screen to accept user input of a search string;
   ii. transmit the search string to a search engine;
   iii. accept search results from the search engine, the search results including rank values;
   iv. transform the search results into representative icons with the icons having non-linear positional, size, shape, color, and decorative properties, the positional properties, size, shape, color, and decorative properties adjusted by user selected options;
   v. transform the non-linear positional, size, shape, color, and decorative properties into screen input;
   vi. generate the display of links entering or exiting the search results;
   vii. transmit the screen input to the display screen;
   viii. wherein a search result:
      a) with a relatively lame number of lower rated links is displayed with short thin lines to emulate peach fuzz;
      b) with relatively many medium rated links is displayed with thick spaghetti type lines; and
      c) with relatively few highly rated links is displayed with a spiky emblematic depiction.

2. The system of claim 1 including machine readable instructions causing the processor to generate a center point upon the display screen and causing each icon to be displayed at a distance from the center point in proportion to each icon's corresponding search result rank.

3. The system of claim 1 including the illustration of each icon in a size proportional to each icon's corresponding search result rank.

4. The system of claim 1 including the display of icons arranged upon the display screen at an angle from the center point to maximize the distance between icons representing like ranked search results.

5. The system of claim 1 including the display of icons in a ring view, such that icons are grouped within ranges of ranked values and each grouping is displayed within a set radial distance from the center point.

6. The system of claim 1 including the display of links entering or exiting search results, with different colors used to depict different link ages.

7. The system of claim 1 including the display of links entering or exiting search results, with lines drawn between search results and other web objects.

8. The system of claim 1 wherein the physical display presents a zoom, pan and pinch interface, an attributes toggle interface changing the presentation of attributes including link attributes of results and a rewind interface presenting changes in result positional properties, size, shape, color, and decorative properties as a function of time.

9. A computer implemented method, using a processor, server device, non-transitory machine readable medium, one or more data bases and memory for presenting search results upon a physical screen display, the method comprising:
   a) using a non-transitory machine readable storage medium for containing machine readable instructions;
   b) using a processor coupled to the non-transitory machine readable storage medium, the processor executing the machine readable instructions to cause the processor to:
   I. using a server, present an input interface upon a display screen to accept user input of a search string and using memory and a database, store the user input search string;
   II. transmit the search string to a search engine;
   III. accept search results from the search engine, the search results including rank values;
   IV. transform the search results into representative icons with the icons having non-linear positional, size, shape, color, and decorative properties, the positional, size, shape, color, and decorative properties adjusted by user selected options;
   V. transform the non-linear positional, size, shape, color, and decorative properties of the icons into screen input;
   VI. generate the display of links entering or exiting the search results;
   VII. transmit the screen input to the display screen;
   VIII. wherein a search result:
      a) with a relatively lame number of lower rated links is displayed with short thin lines to emulate peach fuzz;
      b) with relatively many medium rated links is displayed with thick spaghetti type lines; and
      c) with relatively few highly rated links is displayed with a spiky emblematic depiction.

10. The method of claim 9, including the step of generating a center point upon the display screen and displaying each represented search result at a distance from the center point in proportion to the search result's rank and displaying each search result in a size proportional to a search result's rank.

11. The method of claim 9 including the step of arranging results upon the display screen at an angle from the center point to maximize the distance between like ranked search results.

12. The method of claim 9 including the step of representing search results in a ring view, such that represented search results are grouped within ranges of ranked values and each grouping is displayed within a set radial distance from the center point.

13. The method of claim 9 including the display of links entering or exiting search results, with different colors used to depict different link ages.

14. The method of claim 9 including the display of links entering or exiting search results, with lines drawn between search results and other web objects.

15. The method of claim 9 including the step of presenting a zoom, pan and pinch interface upon the display.

16. The method of claim 9 including the step of presenting an interface upon the display, the interface allowing a user to review changes in search result attributes as a function of time.

\* \* \* \* \*